US012569784B2

(12) United States Patent
Zhang et al.

(10) Patent No.: US 12,569,784 B2
(45) Date of Patent: Mar. 10, 2026

(54) METHOD FOR REMOVING SILICON POWDER IN COOLANT FOR MONOCRYSTALLINE SILICON SLICING WITH DIAMOND WIRE

(71) Applicant: TCL ZHONGHUAN RENEWABLE ENERGY TECHNOLOGY CO., LTD., Tianjin (CN)

(72) Inventors: Haiming Zhang, Tianjin (CN); Xuzhou Yang, Tianjin (CN); Junwen Guo, Tianjin (CN); Chen Wei, Tianjin (CN)

(73) Assignee: TCL ZHONGHUAN RENEWABLE ENERGY TECHNOLOGY CO., LTD., Tianjin (CN)

( * ) Notice: Subject to any disclaimer, the term of this patent is extended or adjusted under 35 U.S.C. 154(b) by 338 days.

(21) Appl. No.: 18/548,086

(22) PCT Filed: Jul. 31, 2023

(86) PCT No.: PCT/CN2023/110422
§ 371 (c)(1),
(2) Date: Aug. 26, 2023

(87) PCT Pub. No.: WO2024/060845
PCT Pub. Date: Mar. 28, 2024

(65) Prior Publication Data
US 2025/0032959 A1 Jan. 30, 2025

(30) Foreign Application Priority Data
Sep. 22, 2022 (CN) .......................... 202211156307.1

(51) Int. Cl.
B01D 21/01 (2006.01)
B01D 21/28 (2006.01)
(Continued)

(52) U.S. Cl.
CPC ........... B01D 21/01 (2013.01); B01D 21/286 (2013.01); B03D 3/02 (2013.01); B28D 5/0076 (2013.01);
(Continued)

(58) Field of Classification Search
None
See application file for complete search history.

(56) References Cited

FOREIGN PATENT DOCUMENTS

| CN | 106082233 A | * | 11/2016 | ........... C01B 33/037 |
| CN | 106746019 A | * | 5/2017 | ................ C02F 9/00 |

(Continued)

OTHER PUBLICATIONS

Machine translation of CN 106082233 A, pp. 1-5. (Year: 2016).*
(Continued)

*Primary Examiner* — Clare M Perrin
(74) *Attorney, Agent, or Firm* — PV IP PC; Wei Te Chung

(57) ABSTRACT

The present disclosure provides a method for removing silicon powder in a coolant for monocrystalline silicon slicing with a diamond wire, including following steps: preparing an inorganic coagulation-inducing saline solution; mixing the inorganic coagulation-inducing saline solution with a waste coolant of the coolant after monocrystalline silicon slicing to obtain a mixture, and leaving the mixture to stand to carry out agglomeration and precipitation of the silicon powder. The inorganic coagulation-inducing saline solution has advantages of being inexpensive, non-toxic, easy to obtain, and achieving good agglomeration and precipitation. It is inexpensive to remove the silicon powder in the waste coolant for the monocrystalline silicon slicing with the diamond wire, and does not cause environmental
(Continued)

pollution. The recovered silicon powder can be recycled and sold again, and the coolant can be reused for cutting after simple treatment.

13 Claims, 2 Drawing Sheets

(51) Int. Cl.
_B03D 3/02_ (2006.01)
_B28D 5/00_ (2006.01)
_C01B 33/18_ (2006.01)

(52) U.S. Cl.
CPC ...... _B01D 2221/14_ (2013.01); _B01D 2251/60_ (2013.01); _B01D 2257/55_ (2013.01); _C01B 33/18_ (2013.01)

(56) References Cited

FOREIGN PATENT DOCUMENTS

| CN | 108059223 | A | * | 5/2018 | ............ C02F 1/5281 |
| --- | --- | --- | --- | --- | --- |
| CN | 108191106 | A | * | 6/2018 | ............... C02F 9/00 |
| CN | 109319910 | A | * | 2/2019 | ............... C02F 1/60 |
| CN | 110818137 | A | * | 2/2020 | ............... C02F 9/00 |
| CN | 112424401 | A | | 2/2021 | |
| CN | 113754172 | A | | 12/2021 | |
| CN | 215439951 | U | | 1/2022 | |
| JP | 2012006115 | A | | 1/2012 | |

OTHER PUBLICATIONS

Machine translation of CN-106746019-A, pp. 1-7. (Year: 2017).*
Machine translation of CN-110818137-A, pp. 1-10. (Year: 2020).*
Machine translation of CN-108059223-A, pp. 1-5. (Year: 2018).*
Machine translation of CN-109319910-A, pp. 1-9. (Year: 2019).*
Machine translation of CN-108191106-A, pp. 1-5. (Year: 2018).*
International Search Report in International application No. PCT/CN2023/110422, mailed on Nov. 5, 2023.
Written Opinion of the International Search Authority in International application No. PCT/CN2023/110422, mailed on Nov. 5, 2023.

* cited by examiner

METHOD FOR REMOVING SILICON POWDER IN COOLANT FOR MONOCRYSTALLINE SILICON SLICING WITH DIAMOND WIRE

CROSS-REFERENCE TO RELATED APPLICATION

The present disclosure claims priority to and the benefit of Chinese Patent Application No. 202211156307.1, filed in the China National Intellectual Property Administration on Sep. 22, 2022, the disclosure of which is hereby incorporated by reference in its entirety.

FIELD OF DISCLOSURE

The present disclosure relates to a field of manufacturing monocrystalline silicon and in particular, to a method for removing silicon power in a coolant for monocrystalline silicon slicing with a diamond wire.

BACKGROUND

Solar power generation mainly adopts ultra-thin monocrystalline silicon wafer technology. Although solar power has advantages of being inexpensive and easy to obtain, long lifespan, and stable and high efficiency, it requires an expensive liquid (i.e., a coolant for short) that can effectively control a foam height, efficiently cool and lubricate a diamond wire to reduce wear and consumption of the diamond wire, so as to ensure that cut silicon wafers can be produced with good repeatability and excellent and stable quality. Therefore, in actual production processes, ultrafine silicon powder/particles (usually around 200 nanometers) will continuously enter the coolant during a slicing process, resulting in a higher and higher content of silicon powder. Moreover, because the coolant has a high content of organic materials and certain viscosity, how to effectively remove the silicon powder in the circulating coolant has become a worldwide problem. The higher and higher content of silicon powder in the circulating coolant not only reduces the quality of the monocrystalline silicon wafers, but also causes a huge burden for enterprises to reduce environmental pollution. Therefore, there are significant economic and environmental benefits for the solar photovoltaic industry to effectively reduce the content of ultrafine silicon powder in the coolant and at the same time recycle the coolant and recover the ultrafine silicon powder.

At present, a silicon-containing waste coolant is usually circulated using a plate and frame filter press to reduce a content of silicon powder. However, the particles of silicon powder are too fine, the silicon powder has a high concentration, and the coolant has a certain viscosity, and as a result, the filter press has low filter efficiency, and it is difficult to meet actual production and processing needs. A resin adsorption separation method can also be used, which can effectively reduce a content of ultrafine silicon powder in a circulating coolant, but there are still many shortcomings, mainly as follows: (1) The adsorption resin is expensive and the amount of feed is large (2) The adsorption resin needs to be regenerated, which not only produces a large amount of waste liquid, but also makes an entire process cumbersome and difficult to automate; (3) The resin does not achieve ideal results in adsorption and agglomeration of ultrafine silicon powder.

SUMMARY

In view of the above problems, the present disclosure provides a method for removing silicon powder in a coolant for monocrystalline silicon slicing with a diamond wire, so as to solve the above or other problems in conventional techniques.

Accordingly, the present disclosure provides a method for removing silicon powder in a coolant for monocrystalline silicon slicing with a diamond wire, including following steps:

preparing an inorganic coagulation-inducing saline solution;

mixing the inorganic coagulation-inducing saline solution with a waste coolant of the coolant after the monocrystalline silicon slicing to obtain a mixture, and leaving the mixture to stand to carry out agglomeration and precipitation of the silicon powder.

In some embodiments of the present disclosure, the step of preparing the inorganic coagulation-inducing saline solution includes:

obtaining calcium salt and magnesium salt in a predetermined mass ratio; and mixing the calcium salt and the magnesium salt with deionized water to prepare an inorganic coagulation-inducing saline solution with a predetermined concentration.

In one embodiment, the calcium salt is calcium chloride, and the magnesium salt is magnesium chloride.

In one embodiment, the mass ratio of the calcium salt to the magnesium salt is in a range from 0.5 to 2.0.

In one embodiment, the mass ratio of the calcium salt to the magnesium salt is in a range from 1 to 2.

In one embodiment, the concentration of the inorganic coagulation-inducing saline solution is in a range from 0.67 g/L to 2.5 g/L.

In some embodiments of the present disclosure, in mixing the inorganic coagulation-inducing saline solution with the waste coolant after the monocrystalline silicon slicing to obtain the mixture, a volume ratio of the inorganic coagulation-inducing saline solution to the waste coolant after the monocrystalline silicon slicing is 1 to 3.75:12500 to 25000.

In some embodiments of the present disclosure, stirring is carried out when the inorganic coagulation-inducing saline solution is mixed with the waste coolant after the monocrystalline silicon slicing, a stirring speed is in a range from 60 rpm to 120 rpm, and a stirring time is in a range from 10 seconds to 120 seconds.

In some embodiments of the present disclosure, a time that the mixture is left to stand ranges from one minute to 20 minutes.

The above technical solution removes silicon powder in a coolant for monocrystalline silicon slicing with a diamond wire. An inorganic coagulation-inducing saline solution is added to a waste coolant. By mixing and stirring and leaving a mixture of the inorganic coagulation-inducing saline solution and the waste coolant to stand, particles of the silicon powder in the waste coolant are agglomerated and precipitated, and then the silicon powder is recovered, and the coolant can be reused. The inorganic coagulation-inducing saline solution is prepared by adding calcium salt and magnesium salt in a determined mass ratio to deionized water. The inorganic coagulation-inducing saline solution is inexpensive, non-toxic, easy to obtain, and capable of achieving good agglomeration and precipitation, so that it is inexpensive to remove the silicon powder in the waste coolant for the monocrystalline silicon slicing, and does not cause environmental pollution. Because the content of the silicon powder in the circulating coolant can be reduced rapidly, the present disclosure has important economic value and can protect the environment. The recovered silicon powder can be recycled and sold again, and the coolant can be reused for cutting after simple treatment. The inorganic coagulation-inducing saline solution can be used to treat a waste liquid of a circulating coolant of various brands, various concentrations, and various pH values for slicing a monocrystalline silicon material with a diamond wire. The saline solution is cheap and easy to obtain, used in a small amount, non-corrosive, and able to greatly boost an ability to handle the circulating waste coolant. The present disclosure can simply a conventional process of removing silicon powder in a waste coolant of a coolant for monocrystalline silicon slicing with a diamond wire, greatly reduce costs in equipment investment, and greatly decreases a site area and waste water discharge, and the process can be achieved at low costs.

DETAILED DESCRIPTION OF EMBODIMENTS

Figure 1:
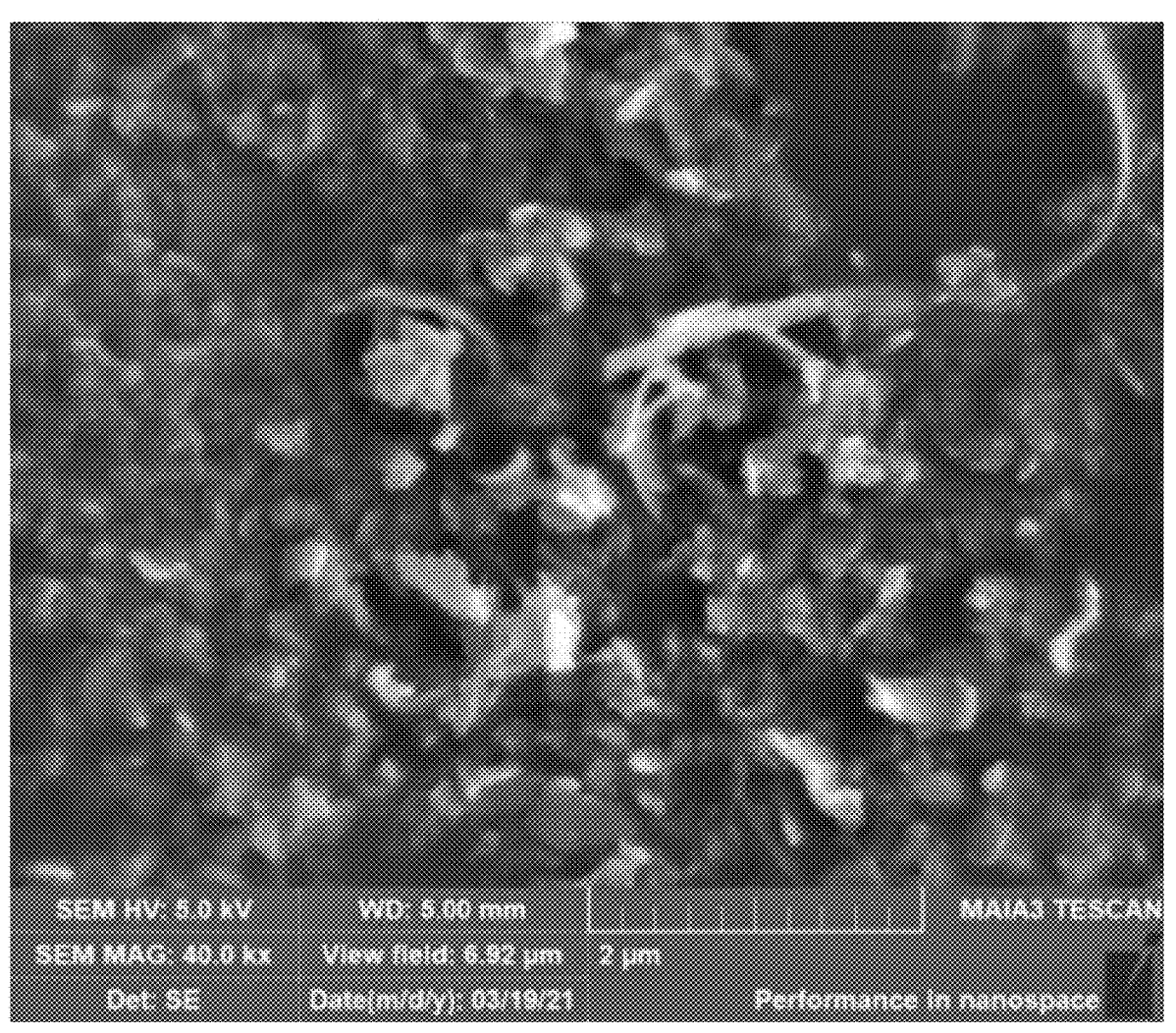
FIG. 1 is a picture taken by a scanning electron microscope, showing ultrafine particles of silicon powder in a coolant for monocrystalline silicon slicing with a diamond wire.

The present disclosure is further described below in conjunction with the accompanying drawings and specific embodiments.

The present disclosure relates to a method for removing silicon powder in a coolant for monocrystalline silicon slicing with a diamond wire, which is used to treat a waste coolant of the coolant after monocrystalline silicon slicing, and remove the silicon powder in the waste coolant. An inorganic coagulation-inducing saline solution is added to the waste coolant after the monocrystalline silicon slicing, so that particles of the silicon powder are agglomerated and precipitated. The process is simple to be achieved at low costs, and the waste coolant can be reused after treatment, and the silicon powder can be recovered after the agglomeration and precipitation.

The present disclosure provides a method for removing silicon powder in a coolant for monocrystalline silicon slicing with a diamond wire, including following steps:

obtaining calcium salt and magnesium salt in a predetermined mass ratio, wherein the mass ratio of the calcium salt to the magnesium salt is 0.5 to 2.0. That is to say, the mass of the calcium salt is 0.5 to 2 times the mass of the magnesium salt. The mass ratio is selected according to actual needs, and the present disclosure is not limited in this regard. Preferably, the mass ratio of the calcium salt to the magnesium salt is 1 to 2.

The above-mentioned calcium salt is a calcium salt that is easily soluble in deionized water, which can be calcium chloride, calcium nitrate, or calcium bicarbonate. Preferably, in this embodiment, the calcium salt is calcium chloride.

The above-mentioned magnesium salt is a magnesium salt that is easily soluble in deionized water, which can be magnesium chloride, magnesium nitrate, or magnesium sulfate. Preferably, in this embodiment, the magnesium salt is magnesium chloride.

After the calcium salt and the magnesium salt are weighed and obtained, the calcium salt and magnesium salt are mixed with deionized water, the calcium salt and the magnesium salt are dissolved in the deionized water to prepare an inorganic coagulation-inducing saline solution of a predetermined concentration. In the present embodiment, the concentration of the inorganic coagulation-inducing saline solution is 0.67 g/L to 2.5 g/L.

After the inorganic coagulation-inducing saline solution is prepared, the inorganic coagulation-inducing saline solution is mixed with a waste coolant of the coolant after the monocrystalline silicon slicing to obtain a mixture, and the mixture is left to stand still for agglomeration and precipitation of the silicon powder. The inorganic coagulation-inducing saline solution is added to the waste coolant after the monocrystalline silicon slicing, so that particles of the silicon powder agglomerate and precipitate because zeta potentials on surfaces of the silicon powder are changed, so that the silicon powder change from an original repulsion state to an attraction state to destroy a stable state of the silicon powder, and as a result, the silicon powder collide with each other to achieve agglomeration and precipitation.

When the inorganic coagulation-inducing saline solution is mixed with the waste liquid coolant after the monocrystalline silicon slicing, the volume ratio of the inorganic coagulation-inducing saline solution to the waste coolant after the monocrystalline silicon slicing is (1 to 3.75): (12500 to 25000). The volume ratio of the inorganic coagulation-inducing saline solution to the waste coolant after the monocrystalline silicon slicing can be selected according to actual needs, and the present disclosure is not limited in this regard.

Stirring is carried out when the inorganic coagulation-inducing saline solution is mixed with the waste coolant from the monocrystalline silicon slicing, a stirring speed is 60 rpm to 120 rpm, and a stirring time is 10 seconds to 120 seconds, so that the inorganic coagulation-inducing saline solution and the waste coolant are fully mixed. The stirring speed and the stirring time are selected according to actual needs, and the present disclosure is not limited in this regard.

The inorganic coagulation-inducing saline solution is mixed with the waste coolant after the monocrystalline silicon slicing, and then the mixture is left to stand still for 1 minute to 20 minutes, so that the silicon powder is sufficiently agglomerated and precipitated.

Figure 2:
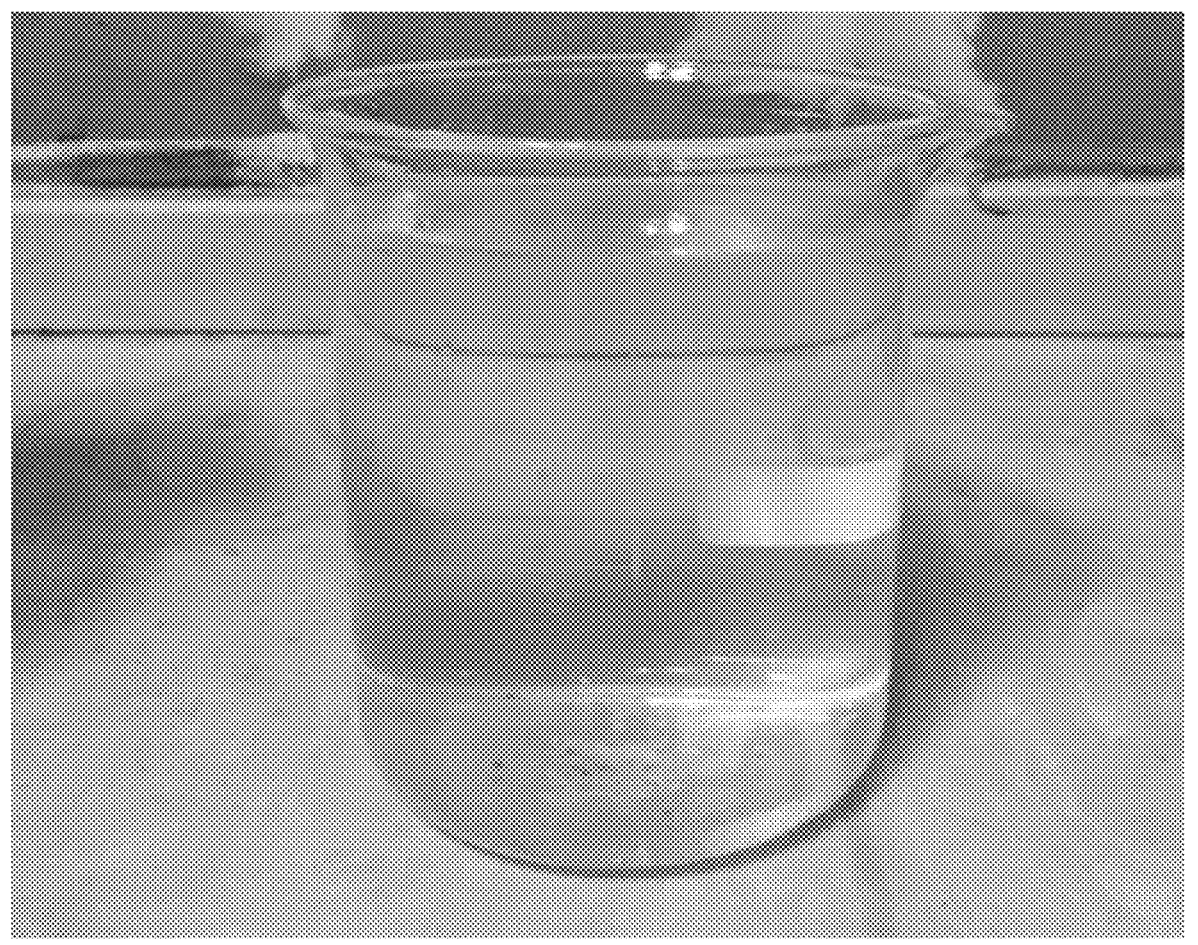
FIG. 2 is picture showing a low-silicon-powder-concentration upper layer of a waste coolant after an inorganic coagulation-inducing saline solution is added.

In the waste coolant of the coolant for the monocrystalline silicon slicing with the diamond wire, silicon powder is in the form of particles. FIG. 1 is a picture taken by a scanning electron microscope, showing ultrafine particles of the silicon powder in the coolant for the ultra-thin monocrystalline silicon slicing with the diamond wire. FIG. 1 shows the silicon powder in the form of particles in the waste coolant. By using the inorganic coagulation-inducing saline solution, the silicon powder in the waste coolant after the monocrystalline silicon slicing is agglomerated and precipitated to remove the silicon powder in the waste coolant. After the silicon powder is agglomerated and precipitated, the waste coolant is stratified, the solids content in an upper clear layer of the waste coolant is 0.01% to 0.15%, a removal rate of the silicon powder is high, and the removal performance is good. Please refer to FIG. 2. FIG. 2 shows the waste coolant has an upper clear layer with a low concentration of silicon powder, wherein the upper clear layer of the waste coolant has a low solids content, and the transparency of the upper clear layer of the waste coolant is high.

Several embodiments are described below.

First Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 100 mL inorganic coagulation-inducing saline solution (prepared by dissolving calcium chloride and magnesium chloride in deionized water. The mass ratio of calcium chloride to magnesium chloride is 1:1, and the concentration of the inorganic coagulation-inducing saline solution is 1 g/L), stirring and mixing for 60 seconds to make the ultrafine silicon powder agglomerate and precipitate, and then leaving stand still for 20 minutes the mixture of the inorganic coagulation-inducing saline solution and the waste coolant. After the mixture is left to stand still, the silicon powder drops to a height at 65% of a liquid level. The ultrafine silicon powder agglomerate, become large particles, and sink in water. The solids content of the upper clear layer of the mixture is measured as 0.11%.

Second Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 200 mL inorganic coagulation-inducing saline solution (prepared by dissolving calcium chloride and magnesium chloride in deionized water. The mass ratio of calcium chloride to magnesium chloride is 1:1, and the concentration of the inorganic coagulation-inducing saline solution is 1 g/L), stirring and mixing for 60 seconds to make ultrafine silicon powder agglomerate and precipitate, and then leaving stand still for 10 minutes the mixture of the inorganic coagulation-inducing saline solution and the waste coolant. After the mixture is left to stand still, the silicon powder drops to a height at 70% of a liquid level, and the solids content of the upper clear layer of the mixture is measured to be 0.08%.

Third Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 150 mL inorganic coagulation-inducing saline solution (prepared by dissolving calcium chloride and magnesium chloride in deionized water. The mass ratio of calcium chloride to magnesium chloride is 1:1, and the concentration of the inorganic coagulation-inducing saline solution is 1.5 g/L), stirring and mixing for 60 seconds to make ultrafine silicon powder agglomerate and precipitate, and then leaving stand still for 9 minutes the mixture of the inorganic coagulation-inducing saline solution and the waste coolant. After the mixture is left to stand still, the silicon powder drops to a height at 75% of a liquid level, and the solids content of the upper clear layer of the mixture is measured to be 0.04%.

Fourth Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 150 mL inorganic coagulation-inducing saline solution (prepared by dissolving calcium chloride and magnesium chloride in deionized water. The mass ratio of calcium chloride to magnesium chloride is 1.5:1, and the concentration of the inorganic coagulation-inducing saline solution is 1.5 g/L), stirring and mixing for 60 seconds to make the ultrafine silicon powder agglomerate and precipitate, and then leaving stand still for 7 minutes the mixture of the inorganic coagulation-inducing saline solution and the waste coolant. After the mixture is left to stand still, the silicon powder drops to a height at 80% of a liquid level, and the solids content of the upper clear layer of the mixture is measured to be 0.01%.

Fifth Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 200 mL inorganic coagulation-inducing saline solution (prepared by dissolving calcium chloride and magnesium chloride in deionized water. The mass ratio of calcium chloride to magnesium chloride is 1.5:1, and the concentration of the inorganic coagulation-inducing saline solution is 1.8 g/L), stirring and mixing for 60 seconds to make the ultrafine silicon powder agglomerate and precipitate, and then leaving stand still for 5 minutes the mixture of the inorganic coagulation-inducing saline solution and the waste coolant. After the mixture is left to stand still, the silicon powder drops to a height at 89% of a liquid level, and the solids content of the upper clear layer of the mixture is measured to be 0.01%.

Sixth Embodiment

Taking 1.25 T waste coolant (a mass fraction of the silicon powder is 3% to 4%, and pH is between 5 and 6.5) for the ultra-thin monocrystalline silicon slicing with the diamond wire, placing the waste coolant in an adsorption stirring tank, adding 200 mL inorganic coagulation-inducing saline solution (prepared by dissolving calcium chloride and magnesium chloride in deionized water. The mass ratio of calcium chloride to magnesium chloride is 1.5:1, and the concentration of the inorganic coagulation-inducing saline solution is 2 g/L), stirring and mixing for 60 seconds to make the ultrafine silicon powder agglomerate and precipitate, and then leaving stand still for 4 minutes the mixture of the inorganic coagulation-inducing saline solution and the waste coolant. After the mixture is left to stand still, the silicon powder drops to a height at 92% of a liquid level, and the solids content of the upper clear layer of the mixture is measured to be 0.07%.

The following table shows the experimental data of the above-mentioned embodiments, and the experimental data is summarized in the table below:

| No. | Amount of waste coolant (T) | Mass ratio of calcium chloride to magnesium chloride | Concentration of inorganic coagulation-inducing saline solution (g/L) | Feed amount of inorganic coagulation-inducing saline solution (mL) | Stirring time (S) | Precipitation time (min) | Precipitate height ratio (%) | Solids content (%) |
|-----|------|------|------|------|------|------|------|------|
| 1 | 1.25 | 1:1 | 1 | 100 | 60 | 20 | 65 | 0.11 |
| 2 | 1.25 | 1:1 | 1 | 200 | 60 | 10 | 70 | 0.08 |

-continued

| No. | Amount of waste coolant (T) | Mass ratio of calcium chloride to magnesium chloride | Concentration of inorganic coagulation-inducing saline solution (g/L) | Feed amount of inorganic coagulation-inducing saline solution (mL) | Stirring time (S) | Precipitation time (min) | Precipitate height ratio (%) | Solids content (%) |
|---|---|---|---|---|---|---|---|---|
| 3 | 1.25 | 1:1 | 1.5 | 150 | 60 | 9 | 75 | 0.04 |
| 4 | 1.25 | 1.5:1 | 1.5 | 150 | 60 | 7 | 80 | 0.01 |
| 5 | 1.25 | 1.5:1 | 1.8 | 200 | 60 | 5 | 89 | 0.01 |
| 6 | 1.25 | 1.5:1 | 2 | 200 | 60 | 4 | 92 | 0.07 |

From the above table, it can be known that the inorganic coagulation-inducing saline solution is added to the waste coolant used for the monocrystalline silicon slicing. After the silicon powder is agglomerated and precipitated, the solids content of the upper layer of the waste coolant is low, and the silicon powder is sufficiently removed.

Specifically, it can be known from the above table that as the amount of the inorganic coagulation-inducing saline solution increases, the silicon powder agglomerate and precipitate, and the solids content of the upper layer of the waste coolant is getting lower, so the silicon powder is properly removed. Under the circumstance that the feed amount of the inorganic coagulation-inducing saline solution is the same, the higher the concentration, the lower the solids content of the upper layer of the waste coolant after the silicon powder agglomerates and precipitates. As a result, the silicon powder is properly removed.

The above technical solution removes silicon powder in a coolant for monocrystalline silicon slicing with a diamond wire. An inorganic coagulation-inducing saline solution is added to a waste coolant. By mixing and stirring and leaving a mixture of the inorganic coagulation-inducing saline solution and the waste coolant to stand still, particles of the silicon powder in the waste coolant are agglomerated and precipitated, and then the silicon powder is recovered and the coolant can be reused. The inorganic coagulation-inducing saline solution is prepared by adding calcium salt and magnesium salt in a determined mass ratio to deionized water. The inorganic coagulation-inducing saline solution is inexpensive, non-toxic, easy to obtain, and capable of achieving good agglomeration and precipitation, so that it is inexpensive to remove the silicon powder in the waste coolant for the monocrystalline silicon slicing, and does not cause environmental pollution. Because the content of the silicon powder in the circulating coolant can be reduced rapidly, the present disclosure has important economic value and can protect the environment. The recovered silicon powder can be recycled and sold again, and the coolant can be reused for cutting after simple treatment. The inorganic coagulation-inducing saline solution can be used to treat a waste liquid of a circulating coolant of different brands, different concentrations, and different pH values for slicing a monocrystalline silicon material with a diamond wire. The saline solution is cheap and easy to obtain, used in a small amount, non-corrosive, and able to greatly boost an ability to handle the circulating waste coolant. The present disclosure can simply a conventional process of removing silicon powder in a waste coolant of a coolant for monocrystalline silicon slicing with a diamond wire, greatly reduce costs in equipment investment, and greatly decreases a site area and waste water discharge, and the process can be achieved at low costs.

The present disclosure is described in detail above. The above content only describes preferable embodiments of the present disclosure, and is not intended to limit the protection scope of the present disclosure. All equivalent changes and modifications made based on the protection scope of the present disclosure shall be deemed to still fall within the protection scope of the present disclosure.

What is claimed is:

1. A method for removing silicon powder in a coolant for monocrystalline silicon slicing with a diamond wire, comprising following steps:
   preparing an inorganic coagulation-inducing saline solution, wherein the preparing comprises:
   obtaining calcium salt and magnesium salt in a predetermined mass ratio;
   mixing the calcium salt and the magnesium salt with deionized water to prepare an inorganic coagulation-inducing saline solution with a predetermined concentration, wherein the predetermined concentration is a total concentration of the calcium salt and the magnesium salt; and
   mixing the inorganic coagulation-inducing saline solution with a waste coolant comprising silicon powder obtained from a monocrystalline silicon slicing process, and leaving the mixture to stand to carry out agglomeration and precipitation of the silicon powder.

2. The method for removing the silicon powder in the coolant for the monocrystalline silicon slicing with the diamond wire according to claim 1, wherein the calcium salt is calcium chloride, and the magnesium salt is magnesium chloride.

3. The method for removing the silicon powder in the coolant for the monocrystalline silicon slicing with the diamond wire according to claim 2, wherein the mass ratio of the calcium salt to the magnesium salt is in a range from 0.5 to 2.0.

4. The method for removing the silicon powder in the coolant for the monocrystalline silicon slicing with the diamond wire according to claim 3, wherein the predetermined concentration of the inorganic coagulation-inducing saline solution is in a range from 0.67 g/L to 2.5 g/L.

5. The method for removing the silicon powder in the coolant for the monocrystalline silicon slicing with the diamond wire according to claim 3, wherein in mixing the inorganic coagulation-inducing saline solution and the waste coolant, a volume ratio of the inorganic coagulation-inducing saline solution to the waste coolant is 1 to 3.75:12,500 to 25,000.

6. The method for removing the silicon powder in the coolant for the monocrystalline silicon slicing with the diamond wire according to claim 2, wherein the predetermined concentration of the inorganic coagulation-inducing saline solution is in a range from 0.67 g/L to 2.5 g/L.

7. The method for removing the silicon powder in the coolant for the monocrystalline silicon slicing with the diamond wire according to claim 6, wherein a time that the mixture is left to stand ranges from one minute to 20 minutes.

8. The method for removing the silicon powder in the coolant for the monocrystalline silicon slicing with the diamond wire according to claim 2, wherein in mixing the inorganic coagulation-inducing saline solution with the waste coolant, a volume ratio of the inorganic coagulation-inducing saline solution to the waste coolant is 1 to 3.75: 12,500 to 25,000.

9. The method for removing the silicon powder in the coolant for the monocrystalline silicon slicing with the diamond wire according to claim 1, wherein the mass ratio of the calcium salt to the magnesium salt is in a range from 0.5 to 2.0.

10. The method for removing the silicon powder in the coolant for the monocrystalline silicon slicing with the diamond wire according to claim 9, wherein the mass ratio of the calcium salt to the magnesium salt is in a range from 1 to 2.

11. The method for removing the silicon powder in the coolant for the monocrystalline silicon slicing with the diamond wire according to claim 1, wherein the predetermined concentration of the inorganic coagulation-inducing saline solution is in a range from 0.67 g/L to 2.5 g/L.

12. The method for removing the silicon powder in the coolant for the monocrystalline silicon slicing with the diamond wire according to claim 11, wherein stirring is carried out when the inorganic coagulation-inducing saline solution is mixed with the waste coolant, a stirring speed is in a range from 60 rpm to 120 rpm, and a stirring time is in a range from 10 seconds to 120 seconds.

13. The method for removing the silicon powder in the coolant for the monocrystalline silicon slicing with the diamond wire according to claim 1, wherein in mixing the inorganic coagulation-inducing saline solution with the waste coolant, a volume ratio of the inorganic coagulation-inducing saline solution to the waste coolant is 1 to 3.75: 12,500 to 25,000.

* * * * *